(12) United States Patent
Kenney et al.

(10) Patent No.: US 10,772,050 B1
(45) Date of Patent: Sep. 8, 2020

(54) POWER AND RATE CONTROL ALGORITHM FOR MULTI-ANTENNA COMMUNICATION LINKS IN A MESH NETWORK

(71) Applicant: L3 Technologies, Inc., New York, NY (US)

(72) Inventors: Brent Kenney, Bountiful, UT (US); Philip M. Hirz, Holladay, UT (US); Radivoje Zarubica, Sandy, UT (US); Patrick L. Newbold, Draper, UT (US); Edwin J. Hemphill, Kaysville, UT (US); Jason Wilden, South Jordan, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 0 days.

(21) Appl. No.: 16/530,831

(22) Filed: Aug. 2, 2019

(51) Int. Cl.
    *H04W 52/36* (2009.01)
    *H04W 52/58* (2009.01)
    *H04W 84/18* (2009.01)
    *H04W 52/24* (2009.01)

(52) U.S. Cl.
    CPC ....... *H04W 52/365* (2013.01); *H04W 52/241* (2013.01); *H04W 52/367* (2013.01); *H04W 52/58* (2013.01); *H04W 84/18* (2013.01)

(58) Field of Classification Search
    CPC ............. H04W 52/365; H04W 52/241; H04W 52/367; H04W 52/58; H04W 84/18
    See application file for complete search history.

(56) References Cited

U.S. PATENT DOCUMENTS

| 10,181,972 B1 | 1/2019 | Giallorenzi et al. | |
| 10,356,843 B1 * | 7/2019 | Zarubica | H04W 40/12 |
| 10,560,254 B1 * | 2/2020 | Landon | H04L 7/042 |
| 2019/0187714 A1 * | 6/2019 | He | G05D 1/00 |

* cited by examiner

*Primary Examiner* — Md K Talukder
(74) *Attorney, Agent, or Firm* — Workman Nydegger

(57) ABSTRACT

Transmitting data in a mesh network. A method includes identifying points on a piecewise continuous surface. The piecewise continuous surface defines minimum threshold power values to maintain a predetermined signal-to-noise ratio at a predetermined bitrate for a transmitter node transmitting to one or more receiver nodes in the mesh network. Points of a constant total power surface are identified defining required ratios of transmitting power for transmitting sources of the transmitter node. One or more points on the piecewise continuous surface that intersect with the constant total power surface are identified. As a result, transmitting power levels for the transmitting sources of the transmitter node are identified. As a result, data is transmitted at or above transmitting power levels, using the transmitting sources.

20 Claims, 3 Drawing Sheets

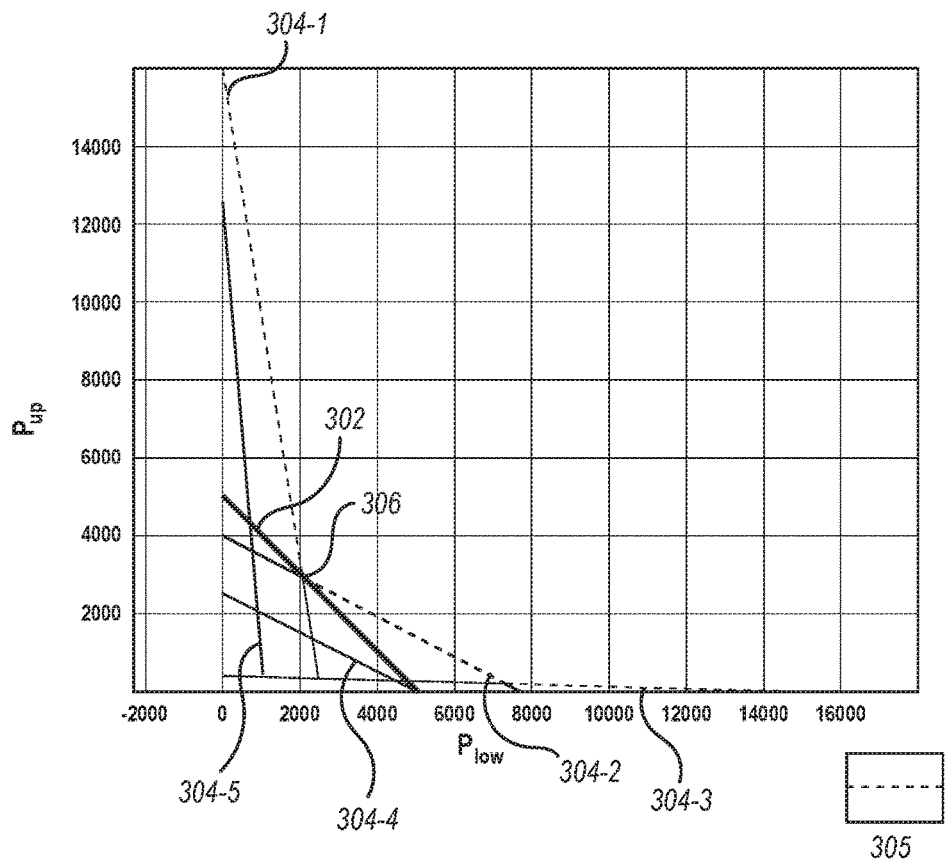
FIG. 3
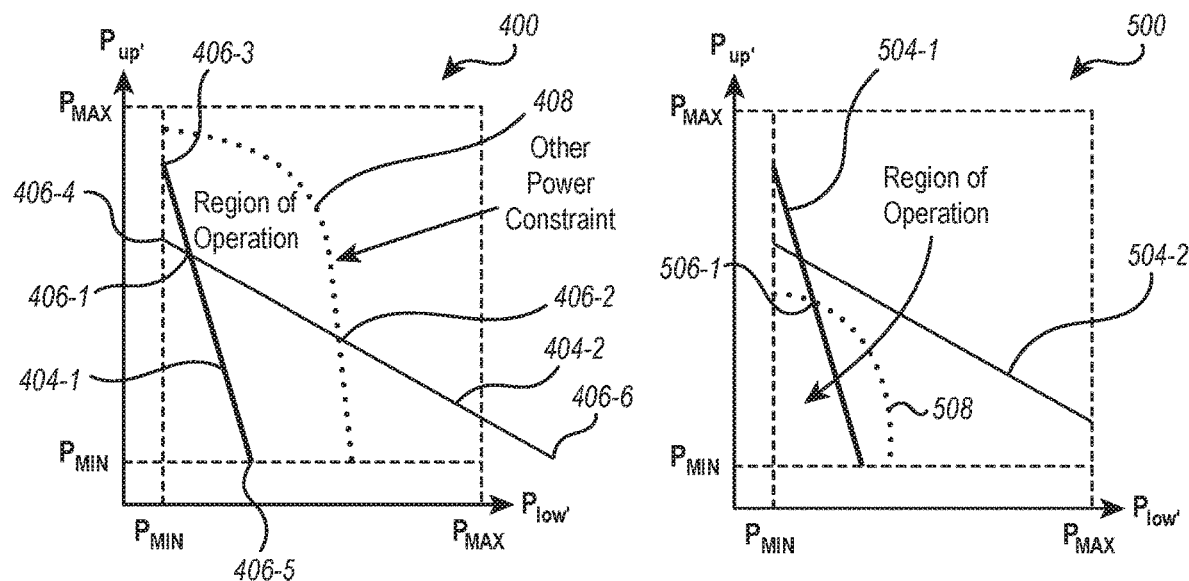
FIG. 4
FIG. 5

POWER AND RATE CONTROL ALGORITHM FOR MULTI-ANTENNA COMMUNICATION LINKS IN A MESH NETWORK

BACKGROUND

Background and Relevant Art

In mesh networks, nodes communicate with each other. When the nodes communicate with each other, it is important that the nodes are able to perform understandable communication. That is, a node receiving a communication should be able to read the data in the communication. Typically, a node's ability to accurately (within some threshold error rate) read data in a communication is defined and/or dependent on the signal-to-noise ratio for the communication.

Signal-to-noise ratio is typically dependent on communication rate (e.g., the bit rate) and the power used to transmit the communication. Typically, these two factors are interrelated. For example, transmitting data at a higher relative power allows the data to be transmitted at a higher relative bit rate while still maintaining a signal-to-noise ratio needed for communications that are within some error rate than at a lower relative power. In contrast, if power is reduced, there is typically a need to perform a corresponding reduction in transmission bit rate to ensure that the communications are sent with the required signal-to-noise ratio for communications within a threshold error rate.

Often, there is a desire to optimize power and rate for sending signals. For example, it may be desirable to transmit using the least amount of power possible, while still maintaining a desired data rate. This can be done to conserve power, to maintain a low probability of detection (LPD) or for other reasons. Accomplishing this can become even more complex when transmitters and receivers incorporate multiple antennas. In particular, optimizing power in a receiver when the receiver includes two antennas adds another dimension and variable, thus increasing complexity when determining how to optimize power.

Further, one reason for having multiple antennas is to avoid blockage due to an aircraft body (or other vehicle) itself. For example, if an antenna is on the top of an aircraft, then there is little antenna gain in the direction of another radio node that is facing the lower part of the aircraft.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a mesh communications network. The method includes acts for transmitting data in the network. The method includes identifying points on a piecewise continuous surface. The piecewise continuous surface defines minimum threshold power values to maintain a predetermined signal-to-noise ratio at a predetermined bitrate for a transmitter node transmitting to one or more receiver nodes in the mesh network. Points of a constant total power surface are identified defining required ratios of transmitting power for transmitting sources of the transmitter node. One or more points on the piecewise continuous surface that intersect with the constant total power surface are identified. As a result, transmitting power levels for the transmitting sources of the transmitter node are identified. As a result, data is transmitted at or above signal to noise ratio levels, using the transmitting sources.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates a plurality of minimum threshold power value lines forming a piecewise continuous minimum threshold power value curve for determining a minimum power for transmitting a signal using two antennas to transmit at a desired signal-to-noise ratio;

FIG. 4 illustrates an example of determining transmit powers when additional power constraints are imposed on the system;

FIG. 5 illustrates an example of determining transmit powers when additional power constraints are imposed on the system.

DETAILED DESCRIPTION

Figure 1:
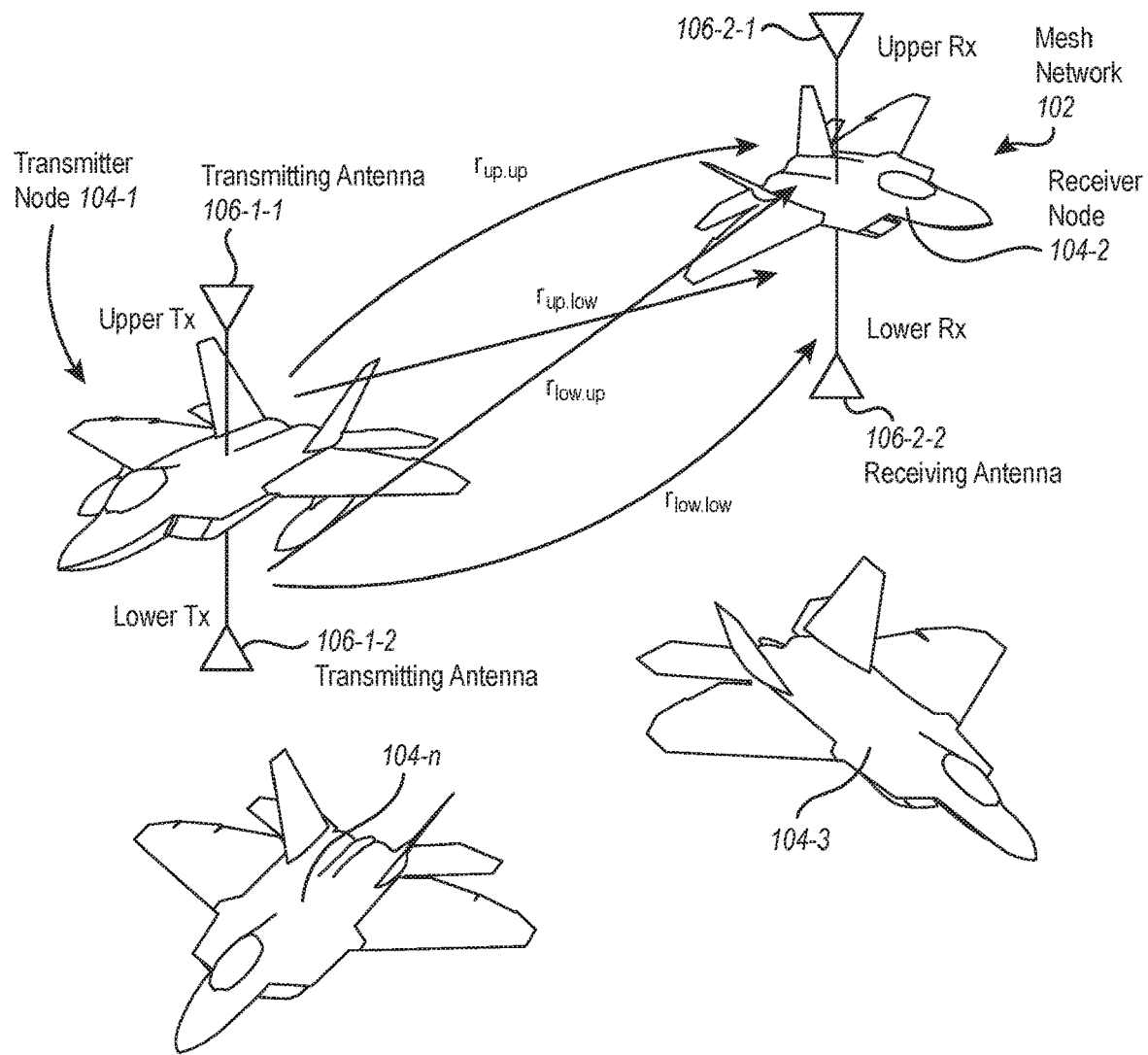
FIG. 1 illustrates a mesh network with a transmitter node and a number of receiver nodes, each of the nodes having two transmitters or two receivers.

Embodiments illustrated herein may include functionality for optimizing power and rate settings for signal transmission in a mesh network where nodes in the mesh network include a plurality of antennas for transmitting and/or receiving signals. For example, some embodiments illustrated herein may use signal-to-noise ratio (SNR) feedback from receivers to transmitters. That is, a receiver will send SNR feedback to the transmitter indicating the SNR of signals received at the receiver. The SNR feedback includes distinct feedback for different combinations of transmitter antennas and receiver antennas when each of these include multiple antennas.

In some embodiments, a transmitting node transmits the same data from one or more antennas using tagged streams (enabling a determination of which antenna a stream is being transmitted from) in a Code Division Multiplex (CDM) scheme. The receiving nodes combine the received signals using Maximal Ratio Combining (MRC), which allows for creating SNR feedback for each distinct antenna combination. For example, assuming two transmitter antennas TA1 and TA2 for a transmitter and two receiver antennas RA1 and RA2 for a receiver, MRC can be used by the receiver to create feedback for the four possible combinations, transmissions from TA1 to RA1, TA1 to RA2, TA2 to RA1, and TA2 to RA2). The receiver can report SNR feedback back to the transmitter relative to each transmitting antenna and receiving antenna. In some embodiments, this can be done efficiently by reporting one value for each transmitting antenna after accounting for the diversity combining scheme used by the receiver. Processing in the transmitter then searches a multi-dimensional space (due to the existence of multiple antennas) to identify a region of operation consistent with the target SNR, data rate demand, and power restrictions. In some embodiments, best-effort settings are reported when data rate demand cannot be satisfied within the power restrictions at the targeted SNR.

Embodiments allow a node with multiple antennas to optimize power settings on each antenna based on feedback from the other nodes in the mesh network, along with various other power constraints. In particular, embodiments transmitting nodes can set an optimum data rate and allocate power between multiple antennas to meet the SNR target for the worst-case receiver in a mesh network given changing power constraints and queue demands. While this is a scalable solution designed for two or more antennas, embodiments can also support single antenna optimization.

The examples below are illustrated in the context of two transmit antennas and two receive antennas. However, it should be appreciated that the concepts can be applied to more antennas. In particular, while "lines" are shown below, it should be appreciated that multi-dimensional "surfaces" can be used in various embodiments. For example, when two transmit antennas are used to transmit a signal, the multi-dimensional surface is a two-dimensional line. When three transmit antennas are used, three-dimensional surfaces can be used. When four transmit antennas are used, four-dimensional surfaces can be used. And so forth.

Referring now to FIG. 1, an example is illustrated. FIG. 1 illustrates various nodes 104 in a mesh network 102. In the example illustrated, the nodes 104 are illustrated as aircraft. However, it should be appreciated that other nodes may be satellites, ground vehicles, stationary ground locations, etc.

In the example illustrated, the nodes discussed include two antennas. For purposes of illustration, an example is shown with a transmitter node 104-1 having two transmitting antennas 106-1-1 and 106-1-2. A receiver node 104-2 is shown having two receiving antennas 106-2-1 and 106-2-2. It should be appreciated however, that a given node likely has both receiving antennas and transmitting antennas, but that for simplicity, the nodes 104 are illustrated having either transmitting or receiving antennas.

Illustrating now a functional example the transmitter node 104-1 sends a signal to the receiver node 104-2. The signal takes four different paths as portions of the signal are transmitted from the transmitting antenna 106-1-1, portions of the signal are transmitted using the transmitting antenna 106-1-2, and portions of the signal are received by receiving antenna 106-2-1 and portions of the signal are received by receiving antenna 106-2-2. This provides for different paths for the signal to be transmitted.

By using Code-Division Multiple Access (CDMA) (or other appropriate transmitting method) the transmitter node 104-1 can provide information in the portion of the signal being transmitted by the transmitting antenna 106-1—that it is being transmitted from that antenna, and that similarly portions of the signal being transmitted from transmitting antenna 106-1-2 are being transmitted from that antenna. This can be done by including the information in a custom field of a message. Thus, when the receiver node 104-2 receives the signal from the transmitter node 104-1, the receiver node 104-2 can determine which antenna on the transmitter node 104-1 transmitted the signal to the receiver node 104-2.

The receiver node 104-2 can determine the signal-to-noise ratio of the received signal. Even more precisely, the receiver node 104-2 can determine signal-to-noise ratios for each of the four paths shown. The combining method used by the receiver then dictates how the two values corresponding to a single transmitting antenna will be represented.

The receiver node 104-2 can then provide this determined signal-to-noise ratio to the transmitter node 104-1. For example, the signal-to-noise ratio determined may be transmitted in a feedback message from the receiver node 104-2 to the transmitter node 104-1.

The transmitter node 104-1 has information available with respect to the power level that was used to transmit the signal to the receiver node 104-2. Thus, the transmitter node 104-1 can determine that a certain signal-to-noise ratio is achieved for the signal at the receiver node 104-2 when the signal was transmitted at a particular power. Even more precisely, this determination can be made based on which antenna sent which portion of the signal. As the transmitter node 104-1 is attempting to achieve a certain signal-to-noise ratio at receiver nodes, at a particular data rate, the transmitter node 104-1 can then determine transmitting power needed to achieve the desired signal-to-noise ratio, at the desired data rate, at the receiver node 104-2.

Note that in some embodiments, this may be a balance determination where the amount of power is determined for each antenna, either individually or together. For example, the transmitter node 104-1 could transmit only using the upper transmitting antenna 106-1-1 (and is not using the lower transmitting antenna 106-1-2), and achieve the desired signal-to-noise ratio and data rate if signal is sent with sufficient power from the transmitting antenna 106-1-1. Similarly, the transmitter node 104-1 could transmit the signal only using the transmitting antenna 106-1-2 (and not using the upper transmitting antenna 106-1-1), and achieve the desired signal-to-noise ratio and data rate if sufficient power is used to transmit the signal from the transmitting antenna 106-1-2. Further, varying amounts of power can be used for each of the antennas 106-1-1 and 106-1-2 to use these antennas in combination while still achieving sufficient power to transmit the signal and to achieve the desired signal-to-noise ratio at the desired data rate.

Figure 2:
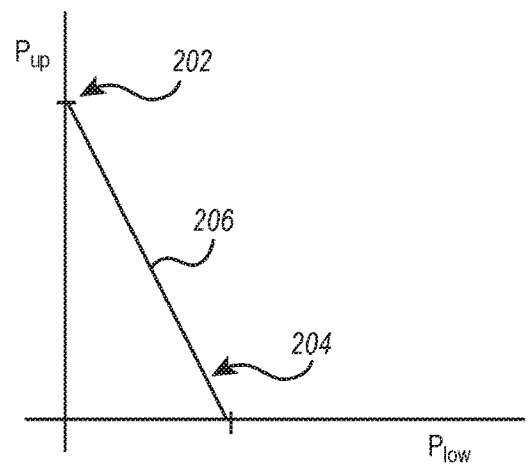
FIG. 2 illustrates a minimum threshold power value line for determining a minimum power for transmitting a signal using two antennas to transmit at a desired signal-to-noise ratio.

Attention is now directed to FIG. 2, which illustrates an example of how this may be achieved using maximal ratio combining. In maximal ratio combining, stronger paths will be weighted more than weaker paths. In particular, generally a linear relationship exists between the adjustment of power to the upper transmitting antenna 106-1-1 and the adjustment of power to the lower transmitting antenna 106-1-2 to achieve the desired signal-to-noise ratio at the desired data rate, but where the power adjustment is dependent on strength of the path such that lower power can be used to transmit in stronger paths and higher power is needed to transmit in weaker paths. Thus, FIG. 2 illustrates an upper antenna intercept 202 corresponding to the power needed to transmit the signal using only the upper transmitting antenna 106-1-1 to achieve the desired signal-to-noise ratio at the desired bit rate; and a lower antenna intercept 204 corresponding to the power needed to transmit the signal using only the lower transmitting antenna 106-1-2 to achieve the desired signal-to-noise ratio at the desired bit rate. If the transmitter node 104-1 uses a combination of the two antennas, so long as the power used for each antenna falls on, or above, the minimum threshold power value line 206, then the signal will be transmitted using sufficient power to achieve the desired signal-to-noise ratio for the desired bit rate.

Note that while up to this point, only two nodes have been illustrated, namely the transmitter node 104-1 and the receiver node 104-2, in a mesh network there are typically multiple notes communicating with each other and thus a transmitter node must transmit the signal with sufficient power such that several different nodes can receive the signal at the desired signal-to-noise ratio and the desired bit rate.

In the example illustrated in FIG. 1, omnidirectional antennas are illustrated. However, in other embodiments, other configurations may be used. Further, it should be appreciated that various blockages may exist that block signals. Further, it should be appreciated that nodes may not know the locations of other nodes.

Returning once again to FIG. 1, FIG. 1 illustrates several different nodes including transmitter node 104-1, receiver node 104-2, receiver node 104-3, through receiver node 104-n. Thus, the transmitter node 104-1 must transmit a signal, using an appropriate combination of power to antennas 106-1-1 and 106-1-2 to achieve appropriate signal-to-noise ratio at the desired data rate to all of the receiver nodes. Note that each of the receiver nodes can provide information back to the transmitter node 104-1 similar to what has been described previously. In particular, each of the receiver nodes can identify the signal-to-noise ratio of the signal received from the transmitter node 104-1, and can further identify signal-to-noise ratio or portions of the signal received based on which antenna was used to send the corresponding portion of the signal. As noted above, in some embodiments, this is accomplished using functionality available in CDMA broadcast techniques or tagged data streams. Thus, each of the receiver nodes will provide information back, in a feedback message, to the transmitter node 104-1 indicating the signal-to-noise ratio achieved per antenna used by the transmitter node 104-1.

The transmitter node 104-1 adjusts power to the transmitting antennas 106-1-1 and 106-1-2 based on the signal-to-noise ratio information received back from the receiver nodes 104-2 through 104-n. In particular, the transmitter node 104-1 identifies a desired data rate and calculates the power needed for each of the transmitting antennas 106-1-1 and 106-1-2 to achieve the desired rate.

Note that determining the power needed is more complex when multiple receiver nodes exist in the mesh network 102. In particular, a more complex determination will need to be performed by evaluating multiple threshold power value lines. An example of this is illustrated in FIG. 3 which shows five different minimum threshold power value lines for five different receiver nodes with respect to a single transmitter node. The various intersections of these lines can be evaluated to identify the minimum amount of power for each antenna that will be required to achieve the desired signal-to-noise ratio at the desired data rate. That is, any point on or above any individual threshold power value line will achieve the desired rate for the corresponding receiver, at or above the targeted SNR. Therefore, embodiments may be configured to identify a point that is on or above all of the lines for all of the receivers.

In some embodiments, this can be conceptualized by using an intersecting constant total power line that has a −1 slope. In particular, a −1 slope line, that is perpendicular to a +1 slope line that passes through the origin, used for a transmitter with two antennas, has exactly the same maximum power when either antenna is used alone. Additionally, any point along that line has exactly the same power as the maximum power for either antenna if used alone. For example, consider an intersecting constant total power line 302 on the graph illustrated in FIG. 3 that intersects the axis of the graph at 5000 mW for the upper antenna and 5000 mW for the lower antenna. Assuming that all transmit power were directed at the upper antenna, then 5000 mW would be used for the upper antenna and 0 mW for the lower antenna. Conversely, if all transmit power were directed at the lower antenna, then 5000 mW would be used for the lower antenna and 0 mW for the upper antenna. Every point along this line would also equal 5000 mW divided between the upper antenna and lower antenna. For example, there is a point on the intersecting line where 4000 mW is directed to the upper antenna and 1000 mW is directed to the lower antenna.

This intersecting line (or similar concepts) can be used to identify the total power used to transmit using the upper and lower antennas, as well as the proportions of power directed at each of the antennas. In particular, a point is identified which is on or above all minimum threshold power value lines by adjusting a line with a −1 slope until it intersects the lowest total power point which is on or above all minimum power threshold value lines. In the example illustrated in FIG. 3, the intersecting line at 302 is shown with a slope of −1 and is shown intersecting an intersection point 306 between a first minimum threshold power value line 304-1 and a second minimum threshold power value line 304-2. The intersection of those two lines, in particular at point 306, is at or above one or more points on the minimum threshold power value lines 304-1, 304-2, 304-3, 304-4, and 304-5. As such, that point 306 represents the minimum power for the upper antenna and lower antenna that can be used to satisfy the signal-to-noise ratio to ensure that data can be sent at a desired data rate. In the example illustrated in FIG. 3, that point is approximately 3000 mW used for transmitting using the upper antenna and 2000 mW used for transmitting using the lower antenna.

Note that while the constant total power line 302 is shown, embodiments will not necessarily use the entire constant total power line 302 or similar line to identify the minimum transmission power point. Rather, in some embodiments a power intersection point (in this case, point 306), which is a point on the line 302, of two minimum threshold power value lines (or other point defined by other constraints or vertices) that can satisfy the minimum power constraints for all receiver nodes will identify the minimum transmission power point. In particular, embodiments will identify various points, including: all intersections between all minimum threshold power value lines, all intersections of minimum threshold power value lines with other power constraints, and all intersections of minimum threshold power value lines with power vertices representing an absolute minimum power. From among these points, a point that satisfies the minimum power constraints for all receiver nodes (i.e., a point that is on or above all minimum threshold power value lines), and that uses the least overall power among all of the points identified, will be identified as the minimum power point, and will be used to determine how much power is used for transmitting the signal using each antenna.

For example, reference is now made to FIG. 4. FIG. 4 illustrates a graph 400. The graph 400 shows two minimum threshold power value lines 404-1 and 404-2. These two lines intersect at a point 406-1, which is added to a set of points.

FIG. 4 further illustrates a piecewise continuous constraint curve 408. The piecewise continuous constraint curve 408 represents certain external constraints placed on the transmitter. For example, the piecewise continuous constraint curve 408 may define maximum powers that may be output by various antennas. That is, certain constraints may be placed on a transmitter node with respect to the amount of power the transmitter node is able to output either overall or from a given antenna. Embodiments can minimize the transmission power for a number of different reasons. For example, as discussed above, embodiments may try to maintain power below some predetermined total power to implement a low probability of detection system, low probability of intercept system, and/or to prevent adversarial entities from geolocating the transmitters, or for other reasons intended to limit power from the transmitter node. Dynamic power limits defined by the constraint curve 408 may be based on orientation changes, aircraft roll, ground enemy detectors, airborne enemy detectors, etc.

As illustrated in FIG. 4, the minimum threshold power value line 404-2 intersects with the piecewise continuous constraint curve 408 at a point 406-2. Thus, in the illustrated example, this point 406-2 is added to the set of identified points.

Further, the minimum threshold power value lines 404-1 and 404-2 both intersect with a minimum power value line for a first antenna as illustrated at the points 406-3 and 406-4. These two points are also added to the set of identified points.

Further the minimum threshold power value lines 404-1 and 404-2 both intersect with a minimum power value line for a second antenna as illustrated at the points 406-5 and 406-6. Therefore, these two points are also added to the set of identified points.

All of the identified points are evaluated, and a lowest total power point that is on a point on or above all minimum threshold power value lines, from among the points is identified. That is, the point that will cause transmission from the first antenna and the second antenna to have a combined lowest power, but that is still on or above all of the minimum threshold power value lines, is selected. In this case, that point is the point 406-1.

Note that sometimes additional power constraints will not allow a point to be selected that is above all of the minimum threshold power value lines. An example of this is illustrated in FIG. 5. FIG. 5 illustrates a graph 500 where a piecewise continuous power constraint curve 508 is below all points on the minimum threshold power value line 504-2. However, the piecewise continuous power constraint curve 508 intersects with the minimum threshold power value line 504-1 at a point 506-1. This point 506-1 is selected as the power point for setting the antenna powers. Note that only the node associated with the minimum threshold power value line 504-1 will be able to receive communications from the receiver, in this example.

Alternatively, the transmission rate of the signal from the transmitter could be lowered to lower the minimum threshold power value lines below the piecewise continuous power constraint curve 508. In particular, by lowering the bit rate of the signal transmitted from the transmitter, less power is required to achieve a desired signal-to-noise ratio at the receivers. Thus, lowering the bit rate of the transmitted signal will lower the minimum threshold power value lines 504-1 and 504-2. The bit rate could be lowered to a point where both minimum threshold power value lines 504-1 and 504-2 will have a common point that is below the piecewise continuous power constraint curve 508.

Note that external constraints represented by the piecewise continuous power constraint curves could be different, and could vary. For example, ground vs. airborne detectors may cause the imposition of different external constraints. In some embodiments the piecewise continuous power constraint curve is a fully continuous curve across all pieces. Additionally, or alternatively, it is a box when a fix power limit is set for each antenna. The valid points of operation that are considered are all of the vertices of the piecewise continuous curve, representing the maximum of all of the minimum threshold power value lines, that are within the region of operation. The points where that piecewise continuous curve intersects the region of operation boundaries are also valid points to consider. Note that the region of operation is lower bounded by the minimum power values for each antenna.

Additionally, changing transmitter characteristics, orientations, etc., may cause changes in external constraints. For example, an aircraft orientation may change the external constraints, and therefore the piecewise continuous power constraint curves associated therewith. Thus, the external constraints may change dynamically.

Alternatively or additionally, data rates, signal-to-noise ratios, and other factors may dynamically change resulting in dynamic changes to the minimum threshold power value lines. Thus, determining the amount of power for each antenna to send a signal is a continuous process over time.

Note that as discussed above, some embodiments use CDMA for the signal. This is particularly useful as CDMA includes functionality for identifying where a signal comes from (i.e., from which antenna among multiple antennas a signal is sent). Note that in other embodiments, Time-Division Multiple Access (TDMA) or Frequency-Division Multiple Access (FDMA) may be used with similar benefits. Virtually any modulation where the same information can be transmitted from the transmitter antennas, separated from each other in some manner (e.g. code, time, frequency, etc.), and distinguishable by source antenna at the receiver can be used.

Embodiments illustrated above may solve the Power and Rate control (PAR) problem for multiple transmit and receive antennas using MRC as a diversity technique. This scheme increases transmit range as well as link availability. Previous versions of PAR only set power and rate for a single receive and single transmit antenna. However, the embodiments illustrated herein are backward compatible to single antenna systems. Embodiments can simply use the highest power defined by the minimum power value threshold line directed to a single antenna if needed.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
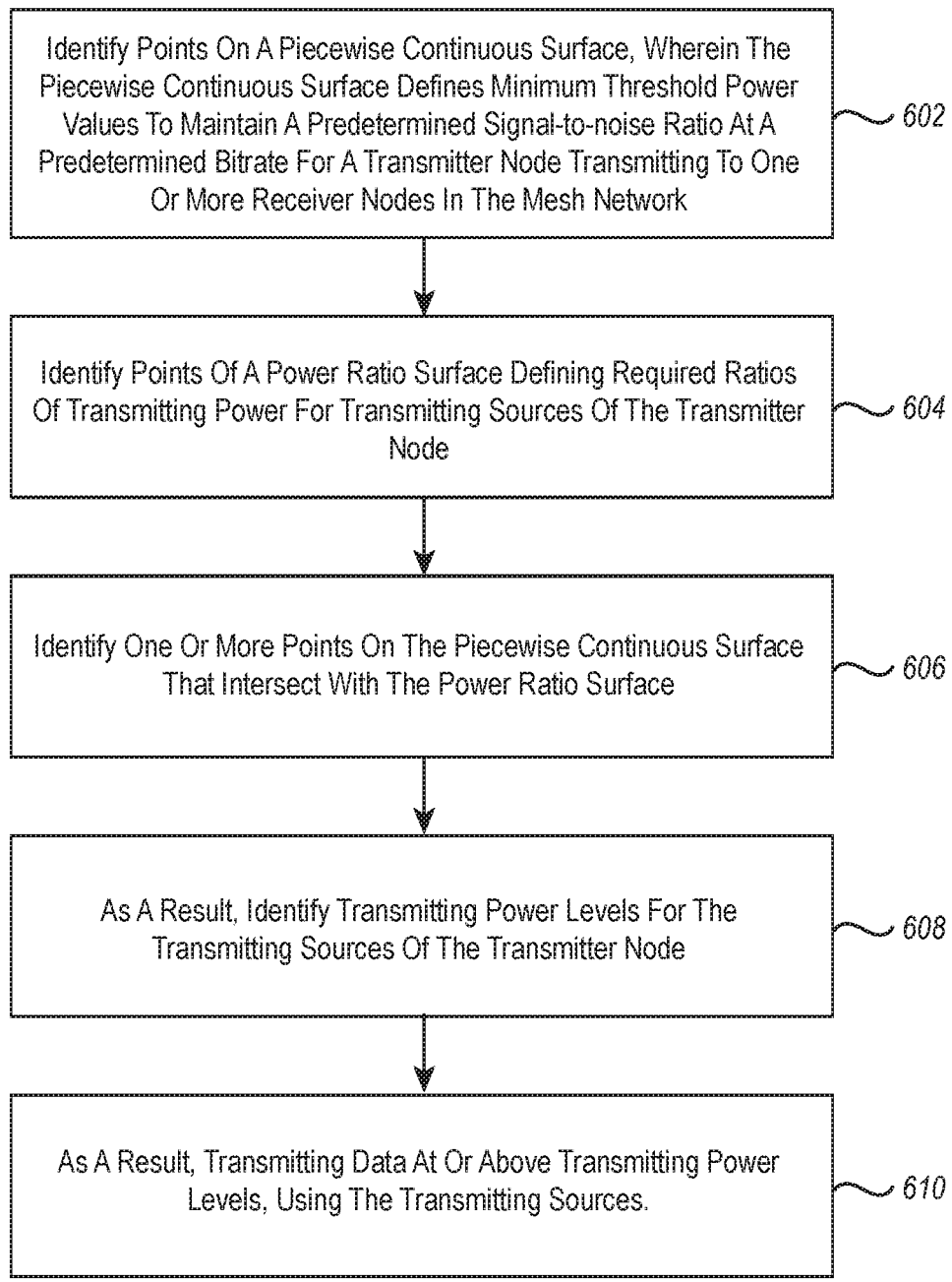
FIG. 6 illustrates a method of transmitting data in a mesh network.

Referring now to FIG. 6, a method 600 is illustrated. The method 600 may be practiced in a mesh communications network. The method 600 includes acts for transmitting data in the network. The method 600 includes identifying points on a piecewise continuous minimum threshold power value surface (act 602). The piecewise continuous minimum threshold power value surface defines minimum threshold power values to maintain a predetermined signal-to-noise ratio at a predetermined bitrate for a transmitter node transmitting to one or more receiver nodes in the mesh network. For example, FIG. 3 illustrates an example of a piecewise continuous curve 305. That is, in the example illustrated in FIG. 3, the piecewise continuous surface is a curve formed from portions of line 304-1, 304-2, and 304-3. This is due to the use of two transmitting and/or two receiving antennas per node, as illustrated above.

The method 600 further includes identifying points of a constant total power surface defining required ratios of transmitting power for transmitting sources of the transmitter node (act 604). Note that this does not require the surface to be identified, rather in some embodiments, points on such a surface are identified. In the example illustrated in FIG. 3, the constant total power surface is a constant total power line 302.

The method 600 further includes identifying one or more points on the piecewise continuous surface that intersect with the constant total power surface (act 606)

As a result, the method 600 further includes identifying transmitting power levels for the transmitting sources of the transmitter node (act 608).

As a result, the method 600 further includes transmitting data at or above transmitting power levels, using the transmitting sources (act 610).

The method 600 may be practiced where the piecewise continuous surface is a piecewise continuous curve. This occurs when two receiving antennas and two transmitting antennas for each node are represented by the surface resulting in the surface being a two-dimensional curve.

The method 600 may be practiced where the constant total power surface comprises a total power curve having a slope of −1, for a transmitter node having two sources. If a transmitter node has more than two sources, then the constant total power surface would have a corresponding number of dimensions. That is, a transmitter with three sources would use a constant total power surface with three dimensions, a transmitter with four sources would use a constant total power surface with four dimensions, and so forth.

The method 600 may further include adjusting the constant total power surface to cause the constant total power surface to intersect with the piecewise continuous surface.

The method 600 may be practiced where identifying points on a piecewise continuous surface includes receiving feedback at the transmitter node from a plurality of other nodes in the mesh communications network. The feedback from each given node in the plurality of nodes identifies signal-to-noise ratio feedback for a plurality of transmitting sources at the transmitter source with respect to a plurality of receivers at the given node, for signals sent by the transmitter node. In some such embodiments, identifying points on a piecewise continuous surface includes aggregating the feedback from the nodes in the plurality of other nodes to identify the piecewise continuous surface points.

In some such embodiments, the signal-to-noise ratio feedback is used to generate per node constraints for minimum transmitter power to maintain a predetermined signal-to-noise ratio, and aggregating the feedback creates the piecewise continuous surface defining minimum threshold power values that would meet the minimum signal to power ratio for all nodes in the plurality of nodes.

The method 600 may be practiced where identifying points on a piecewise continuous surface comprises identifying points limited to a multi-dimension (e.g., global) power constraint surface.

The method 600 may further include determining that a bitrate of the transmitter node is at a value which does not allow for an intersection of the one or more points on the piecewise continuous surface and the constant total power surface. Some such embodiments may further include, as a result, adjusting bitrate for the transmitter node to the predetermined bitrate, such that the predetermined bitrate is at a value that allows for an intersection of the one or more points on the piecewise continuous surface and the constant total power surface.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a mesh communications network, a method of transmitting data in the network, the method comprising:
    identifying points on a piecewise continuous surface, wherein the piecewise continuous surface defines minimum threshold power values to maintain a predetermined signal-to-noise ratio at a predetermined bitrate for a transmitter node transmitting to one or more receiver nodes in the mesh network;
    identifying points of a constant total power surface defining required ratios of transmitting power for transmitting sources of the transmitter node;
    identifying one or more points on the piecewise continuous surface that intersect with the constant total power surface;
    as a result, identifying transmitting power levels for the transmitting sources of the transmitter node; and
    as a result, transmitting data at or above transmitting power levels, using the transmitting sources.

2. The method of claim 1, wherein the piecewise continuous surface is a piecewise continuous curve.

3. The method of claim 1, wherein the constant total power surface comprises a total power curve having a slope of −1 and is perpendicular to a line having a slope of +1 that passes through an origin, for a transmitter node having two sources.

4. The method of claim 1, further comprising adjusting the constant total power surface to cause the constant total power surface to intersect with the piecewise continuous surface.

5. The method of claim 1, wherein identifying points on a piecewise continuous surface comprises:
    receiving feedback at the transmitter node from a plurality of other nodes in the mesh communications network, the feedback from each given node in the plurality of nodes identifying signal-to-noise ratio feedback for a plurality of transmitting sources at the transmitter source with respect to a plurality of receivers at the given node, for signals sent by the transmitter node; and
    aggregating the feedback from the nodes in the plurality of other nodes to identify the piecewise continuous surface points.

6. The method of claim 5, wherein the signal-to-noise ratio feedback is used to generate per node constraints for minimum transmitter power to maintain a predetermined signal-to-noise ratio, and aggregating the feedback creates the piecewise continuous surface defining minimum threshold power values that would meet the minimum signal to power ratio for all nodes in the plurality of nodes.

7. The method of claim 1, wherein identifying points on a piecewise continuous surface comprises identifying points limited to a multi-dimension power constraint surface.

8. The method of claim 1, further comprising:
    determining that a bitrate of the transmitter node is at a value which does not allow for an intersection of the one or more points on the piecewise continuous surface and the constant total power surface; and
    as a result, adjusting bitrate for the transmitter node to the predetermined bitrate, such that the predetermined bitrate is at a value that allows for an intersection of the one or more points on the piecewise continuous surface and the constant total power surface.

9. A system comprising:
    one or more processors; and
    one or more computer-readable hardware devices having stored thereon instructions that are executable by the one or more processors to configure the system to transmit data in a mesh network, including instructions that are executable to configure the system to perform at least the following:
        identify points on a piecewise continuous surface, wherein the piecewise continuous surface defines minimum threshold power values to maintain a predetermined signal-to-noise ratio at a predetermined bitrate for a transmitter node transmitting to one or more receiver nodes in the mesh network;

identify points of a constant total power surface defining required ratios of transmitting power for transmitting sources of the transmitter node;

identify one or more points on the piecewise continuous surface that intersect with the constant total power surface;

as a result, identify transmitting power levels for the transmitting sources of the transmitter node; and as a result, transmit data at or above transmitting power levels, using the transmitting sources.

10. The system of claim 9, wherein the piecewise continuous surface is a piecewise continuous curve.

11. The system of claim 9, wherein the constant total power surface comprises a total power curve having a slope of −1 and is perpendicular to a line having a slope of +1 that passes through an origin, for a transmitter node having two sources.

12. The system of claim 9, wherein identifying points on a piecewise continuous surface comprises:

receiving feedback at the transmitter node from a plurality of other nodes in the mesh communications network, the feedback from each given node in the plurality of nodes identifying signal-to-noise ratio feedback for a plurality of transmitting sources at the transmitter source with respect to a plurality of receivers at the given node, for signals sent by the transmitter node; and aggregating the feedback from the nodes in the plurality of other nodes to identify the piecewise continuous surface points.

13. The system of claim 12, wherein the signal-to-noise ratio feedback is used to generate per node constraints for minimum transmitter power to maintain a predetermined signal-to-noise ratio, and aggregating the feedback creates the piecewise continuous surface defining minimum threshold power values that would meet the minimum signal to power ratio for all nodes in the plurality of nodes.

14. The system of claim 9, wherein identifying points on a piecewise continuous surface comprises identifying points limited to a multi-dimension power constraint surface.

15. The system of claim 9, wherein the one or more computer-readable hardware devices further have stored thereon instructions that are executable by the one or more processors to configure the computer system to perform at least the following:

determining that a bitrate of the transmitter node is at a value which does not allow for an intersection of the one or more points on the piecewise continuous surface and the constant total power surface; and as a result, adjusting bitrate for the transmitter node to the predetermined bitrate, such that the predetermined bitrate is at a value that allows for an intersection of the one or more points on the piecewise continuous surface and the constant total power surface.

16. A computer readable storage device having stored thereon instructions that are executable by the one or more processors to configure a system to transmit data in a mesh network, including instructions that are executable to configure the system to perform at least the following:

identify points on a piecewise continuous surface, wherein the piecewise continuous surface defines minimum threshold power values to maintain a predetermined signal-to-noise ratio at a predetermined bitrate for a transmitter node transmitting to one or more receiver nodes in the mesh network;

identify points of a constant total power surface defining required ratios of transmitting power for transmitting sources of the transmitter node;

identify one or more points on the piecewise continuous surface that intersect with the constant total power surface;

as a result, identify transmitting power levels for the transmitting sources of the transmitter node; and as a result, transmit data at or above transmitting power levels, using the transmitting sources.

17. The computer readable storage device of claim 16, wherein the piecewise continuous surface is a piecewise continuous curve.

18. The computer readable storage device of claim 16, wherein the constant total power surface comprises a total power curve having a slope of −1 and is perpendicular to a line having a slope of +1 that passes through an origin, for a transmitter node having two sources.

19. The computer readable storage device of claim 16, wherein identifying points on a piecewise continuous surface comprises:

receiving feedback at the transmitter node from a plurality of other nodes in the mesh communications network, the feedback from each given node in the plurality of nodes identifying signal-to-noise ratio feedback for a plurality of transmitting sources at the transmitter source with respect to a plurality of receivers at the given node, for signals sent by the transmitter node; and aggregating the feedback from the nodes in the plurality of other nodes to identify the piecewise continuous surface points.

20. The computer readable storage device of claim 16, wherein identifying points on a piecewise continuous surface comprises identifying points limited to a multi-dimension power constraint surface.

* * * * *